United States Patent [19]

Rittler

[11] 4,057,434

[45] Nov. 8, 1977

[54] OPAQUE INFRA-RED TRANSMITTING GLASS-CERAMIC ARTICLES

[75] Inventor: Hermann L. Rittler, Horseheads, N.Y.

[73] Assignee: Corning Glass Works, Corning, N.Y.

[21] Appl. No.: 730,808

[22] Filed: Oct. 8, 1976

Related U.S. Application Data

[63] Continuation-in-part of Ser. No. 603,544, Aug. 11, 1975, abandoned.

[51] Int. Cl.² ............................ C03C 3/22; C03C 3/04
[52] U.S. Cl. ................................. 106/39.7; 106/39.8; 106/52
[58] Field of Search ......................... 106/39.7, 39.8, 52

[56] References Cited

U.S. PATENT DOCUMENTS

| 3,625,718 | 12/1971 | Petticrew | 106/39.7 |
| 3,841,950 | 10/1974 | Planchock et al. | 106/39.7 |
| 3,856,497 | 12/1974 | Hummel | 106/39.7 |

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

This invention relates to the manufacture of highly-crystalline, opaque glass-ceramic articles, wherein the primary crystal phase is a beta-spodumene solid solution, which exhibit coefficients of thermal expansion (25°–700° C.) less than about $15 \times 10^{-7}/°$ C. and, preferably, less than $10 \times 10^{-7}/°$ C., and wherein transmittances to infra-red radiations as great as 60% have been measured at a wavelength of 3.5 microns in samples having thicknesses of about 4.25 mm. Such articles have compositions circumscribed within a narrow field of the $Li_2O$—$Al_2O_3$—$SiO_2$ system nucleated with $TiO_2$ which contain ZnO as the principal modifier ion and are essentially free from the alkaline earth metal oxides, alkali metal oxides other than $Li_2O$, and $ZrO_2$.

1 Claim, No Drawings

4,057,434

OPAQUE INFRA-RED TRANSMITTING GLASS-CERAMIC ARTICLES

This application is a continuation-in-part of my co-pending application Ser. No. 603,544, filed Aug. 11, 1975, now abandoned.

BACKGROUND OF THE INVENTION

As was explained in U.S. Pat. No. 2,920,971, the basic patent in the field of glass-ceramics, the production of such articles contemplates three fundamental steps. First, a glass-forming batch, to which a nucleating agent is commonly added, is melted. Second, this melt is simultaneously cooled to an essentially crystal-free glass and a body of a desired geometry shaped therefrom. Third, the glass body is subjected to a controlled heat treatment which causes the glass body to crystallize in situ. Normally, this third step is conducted in two parts. Thus, the glass is first heated to a temperature somewhat above the transformation range of the glass to cause the development of nuclei therein. Subsequently, the nucleated glass is heated to a higher temperature, frequently above the softening point of the glass, to effect the growth of crystals on the nuclei.

Inasmuch as a glass-ceramic article results from the substantially simultaneous growth of crystals on countless nuclei dispersed throughout the parent glass, the microstructure thereof consists of fine-grained crystals of relatively uniform size, homogeneously dispersed and randomly oriented in a residual glassy matrix. Glass-ceramic articles are generally highly crystalline, i.e. greater than 50% crystalline, such that the physical properties thereof are more closely akin to those of the crystal phase than to those exhibited by the residual glassy matrix. Furthermore, the residual glassy matrix will commonly have a far different composition from that of the original or parent glass body because the constituents composing the crystal phase will have been removed therefrom.

Glass-ceramic compositions have found their greatest utility to date in the fields of dinnerware and culinary ware; an example of the former being CENTURA ® dinnerware and that of the latter being CORNING WARE ® cooking vessels, both being products of Corning Glass Works, Corning, N.Y. More recently, flat sheeting of glass-ceramic material has been utilized as cooking surfaces for stoves, e.g., THE COUNTER THAT COOKS ®, also a product of Corning Glass Works.

In the field of cooking ware, and in particular the use of flat sheeting for stove top applications, it has been recognized that compositions exhibiting good transmission to infra-red radiation could be useful in improving the rate at which food could be cooked on top of the stove. Thus, the heat from the burner source underneath would pass more quickly through the heating surface. However, such an application requires a material having a complex matrix of physical properties. Hence, the material must be mechanically strong to withstand substantial impacts; it must be chemically durable and stain resistant to withstand attack by food contact; and it must demonstrate a uniformly low coefficient of thermal expansion to withstand sharp thermal shocks. These properties are, of course, in addition to the melting and forming capabilities demanded for practical large-scale production techniques. Finally, the composition must be such that the parent or precursor glass body crystallizes uniformly in situ to a fine-grained body exhibiting homogeneous properties.

To date, the glass-ceramic bodies utilized for flat cooking surfaces have commonly been opaque to visible radiations and very poorly transmitting in the infra-red portion of the radiation spectrum. Examples of such materials have been prepared in accordance with U.S. Pat. Nos. 2,920,971, 3,148,994, and 3,582,371. To achieve the desired low coefficient of thermal expansion, compositions have been designed to yield beta-spodumene solid solution as the principal crystal phase. Although the classic formula for spodumene is $Li_2O.Al_2O_3.4SiO_2$, the crystals developed in the glass-ceramic articles do not comply exactly with that formulation. However, the X-ray diffraction pattern yielded by the crystals very closely approximates that of the classic spodumene. Therefore, the crystals have been deemed to be a solid solution $Li_2O.Al_2O_3.nSiO_2$, wherein "$n$" can range from about 3.5 to 10. This, then, is the sense in which the expression "beta-spodumene solid solution" has been employed.

The simple ternary $Li_2O$—$Al_2O_3$—$SiO_2$ nucleated with $TiO_2$ is very difficult to melt and form properly, so various additions have been made thereto in order to improve those properties without deleteriously affecting the physical characteristics thereof. For example, additions of such conventional fluxes as $Na_2O$, $K_2O$, and $B_2O_3$ can unduly raise the coefficient of thermal expansion and/or impair the chemical durability and/or reduce the refractoriness of the final product. This has resulted in the use of the alkaline earth metal oxides and, particularly, MgO and/or CaO. Such additions did, indeed, improve the melting and forming capabilities of the compositions while not substantially altering the physical properties of the final product. However, the crystallized articles were essentially opaque to infra-red radiations.

OBJECTIVES OF THE INVENTION

The primary objective of the instant invention is to provide an opaque glass-ceramic composition exhibiting good mechanical strength, excellent chemical durability, and low coefficient of thermal expansion, and which also can demonstrate over 40% transmission of infra-red radiations at a wavelength of 3.5 microns through a polished plate of about 4.25 mm. thickness, thereby rendering it eminently suitable for use as a flat cooking surface.

Another objective of the instant invention is to provide such a glass-ceramic product which can be made utilizing conventional production methods.

SUMMARY OF THE INVENTION

I have discovered that those objectives can be achieved in $Li_2O$—$Al_2O_3$—$SiO_2$—$TiO_2$ glass-ceramic bodies which are essentially free from the alkaline earth metal oxides and $ZrO_2$ and which utilize ZnO as the principal or sole modifier. Such bodies will have compositions consisting essentially, by weight on the oxide basis, of about 2.5–4.5% $Li_2O$, 17.5–21% $Al_2O_3$, 65–71% $SiO_2$, 0.75–3.5% ZnO, and 3.5–6% $TiO_2$. The complete absence of alkaline earth metal oxides is preferred to achieve the most desirable chemical durability and infra-red transmission characteristics and none will normally be included intentionally. Although $ZrO_2$ is well-recognized as a nucleating agent for the production of glass-ceramic articles, its essential absence from the present compositions is desired to permit the use of conventional production methods with compositions having liquids values below about 1300° C. Up to about 1% $SnO_2$ may also be added to aid nucleation. Fluorine and $P_2O_5$ exert a fluxing action so must be severely limited in quantity, but appear to be useful in aiding high temperature fining of the glass as well as promoting nucleation. The amount of fluorine will be held below about 0.4%, as analyzed in the glass, and that of $P_2O_5$ held below about 1%. Alkali metal oxides other than $Li_2O$ will preferably be essentially absent, the total thereof not exceeding about 0.75%, such that refractoriness, chemical durability, and the coefficient of thermal expansion will not be adversely affected.

PRIOR ART

U.S. Pat. No. 3,625,718 discloses the production of glass-ceramic articles consisting essentially, by weight, of 3.3–4.8% $Li_2O$, 1–3.8% ZnO, 15–23% $Al_2O_3$, 64–74% $SiO_2$, and 1.2–2.4% $TiO_2$. Numerous additional ingredients can be added in varying amounts. For example, MgO and CaO to a total of 2.5%, $ZrO_2$ up to 2% (each of the exemplary compositions recorded in the disclosure contained in excess of 1% $ZrO_2$), alkali metal oxides other than $Li_2O$ up to 2% and $P_2O_5$ up to 3% are noted as being useful additions. There is no discussion regarding infra-red transmission, chemical durability, or resistance to food staining and, as has been observed above, the inclusion of alkaline earth metal oxides deleteriously affects the infra-red transmission of the materials and the presence of alkali metal oxides adversely affects the chemical durability and stain resistance thereof. Finally, the use of $ZrO_2$ leads to high liquidus values as can be seen from the exemplary compositions wherein the lowest temperature reported is 2400° F. (1315° C.).

U.S. Pat. No. 3,856,497 discloses the production of glass-ceramic articles having the same oxide compositions as those described in U.S. Pat. No. 3,625,718 above, but wherein different batch materials are employed. Thus, whereas the mineral petalite was customarily utilized as the source of $Li_2O$ for such compositions, a lithium salt, e.g., $Li_2CO_3$, LiF, or $Li_2SO_4$, was substituted therefor. The straight substitution of such lithium salts for petalite resulted in considerable microcracking, particularly in the surface of the product. The invention lay in adding up to 2.5% $K_2O$, $Rb_2O$, and/or $Cs_2O$ to the overall composition to inhibit the microcracking. Therefore, this patent not only has the same composition differences from the present invention as were discussed above with respect to U.S. Pat. No. 3,625,718, but the purposeful addition of $K_2O$, $Rb_2O$, and/or $Cs_2O$ removes the disclosure even farther from that of the present invention.

DESCRIPTION OF THE PREFERRED EMBODIMENTS

Table I lists several exemplary compositions illustrative of the instant invention, reported in weight percent on the oxide basis. Since it is not known with which cation(s) the fluoride ion is combined, and because it is present in such small amounts, it is simply reported separately as fluoride, in accordance with conventional glass analysis practice. The actual batch ingredients may be any materials, either the oxides or other compounds, which, when melted together, will be converted into the desired oxide in the proper proportions. In the compositions reported, $Na_2O$, $K_2O$, MgO, $ZrO_2$, and $Fe_2O_3$ are present as impurities only since no intentional addition was made thereof. $As_2O_3$ and $Sb_2O_3$ can be included to perform their usual function as fining agents.

The batch ingredients were compounded and ball-milled together to assist in securing a homogeneous melt. The mixture was then run into a platinum crucible. After placing a lid thereon, the crucible was moved to a gas-fired furnace operating at 1600°–1650° C. and maintained therein for 16 hours. The resulting melt was then poured into a steel mold to yield a slab about 6 inches × 6 inches × ¼ inch and immediately transferred to an annealer operating at 680° C. The annealed slabs were cut into shapes suitable for testing purposes and then crystallized in situ.

TABLE I

|  | 1 | 2 | 3 | 4 | 5 | 6 |
|---|---|---|---|---|---|---|
| $SiO_2$ | 68.57 | 68.3 | 69.32 | 67.96 | 67.4 | 68.08 |
| $Al_2O_3$ | 19.5 | 19.51 | 18.32 | 18.83 | 19.9 | 18.40 |
| $Li_2O$ | 3.76 | 3.77 | 3.76 | 3.6 | 3.7 | 3.96 |
| MgO | — | — | 0.03 | — | — | — |
| ZnO | 2.67 | 2.8 | 2.58 | 2.8 | 2.6 | 2.01 |
| $TiO_2$ | 4.77 | 4.64 | 4.56 | 4.6 | 4.7 | 6.00 |
| $P_2O_5$ | — | — | 0.43 | 0.4 | 0.1 | 0.6 |
| F | 0.23 | 0.33 | 0.2 | — | — | — |
| $As_2O_3$ | 0.35 | 0.33 | 0.4 | 0.4 | 0.4 | 0.6 |
| $Na_2O$ | 0.1 | 0.25 | 0.3 | 0.26 | 0.1 | 0.25 |
| $K_2O$ | 0.05 | 0.07 | 0.1 | 0.15 | 0.1 | 0.10 |
| $SnO_2$ | — | — | — | 1.0 | 1.0 | — |

|  | 7 | 8 | 9 | 10 | 11 | 12 | 13 |
|---|---|---|---|---|---|---|---|
| $SiO_2$ | 67.67 | 68.92 | 69.47 | 68.55 | 68.71 | 68.89 | 68.09 |
| $Al_2O_3$ | 20.2 | 19.16 | 18.73 | 19.06 | 19.6 | 19.11 | 19.9 |
| $Li_2O$ | 3.74 | 3.63 | 3.66 | 3.68 | 3.73 | 3.63 | 3.72 |
| ZnO | 2.83 | 2.63 | 2.53 | 2.65 | 2.76 | 2.67 | 2.75 |
| $TiO_2$ | 4.65 | 4.73 | 4.74 | 4.75 | 4.48 | 4.72 | 4.65 |
| $As_2O_3$ | 0.32 | 0.31 | 0.3 | 0.3 | 0.24 | 0.3 | 0.3 |
| F | 0.21 | 0.23 | 0.25 | 0.3 | 0.21 | 0.26 | 0.25 |
| $Na_2O$ | 0.18 | 0.17 | 0.13 | 0.38 | 0.13 | 0.15 | 0.16 |
| $K_2O$ | 0.13 | 0.15 | 0.15 | 0.29 | 0.11 | 0.23 | 0.15 |
| $ZrO_2$ | 0.04 | 0.04 | 0.01 | 0.01 | — | 0.01 | 0.01 |
| $Fe_2O_3$ | 0.03 | 0.03 | 0.03 | 0.03 | 0.03 | 0.03 | 0.03 |

The glasses of the present invention can be converted into fine-grained glass-ceramic articles by heat treating at temperatures between about 1050°–1200° C. Inasmuch as the rate of crystal growth is a function of temperature, a longer period of time will be required to complete crystallization at the cooler end of the crystallization range than at the upper. Hence, as little as ¼ hour may be adequate at about 1200° C., whereas 24 hours may be necessary at the lower temperatures.

Longer times may be employed successfully but such are usually not economically attractive, and undesirable grain growth can be hazarded with extended exposures at the uppermost extreme of the range.

In general, more uniformly-sized crystallization will be attained where a two-step heat treatment is utilized. Thus, the glass body is first raised to a temperature somewhat above the transformation range thereof and held for a sufficient length of time to assure the substantial development of nuclei. Thereafter, the temperature is raised above the softening point of the glass to promote the growth of crystals on the nuclei. Since the temperature is elevated above the softening point of the glass, care must be exercised in not doing so at such a rapid rate that there is not sufficient crystal growth to support the body. In order words, too rapid heating of the glass body will result in deformation and/or slumping of the body. Heating rates as rapid as 10° C./minute have been employed successfully where formers or other supports are utilized. However, heating rates of about 5° C./minute have been found satisfactory where no supporting means are present. The utilization of a nucleation step also is helpful in reducing the hazard of deformation as the temperature is raised to the crystallization range. In the preferred practice, nucleation will be undertaken for about 1–6 hours within the temperature range of about 750°–850° C., followed by crystallization for about 2–8 hours at about 1050°–1200° C.

Although in the exemplary compositions of Table I, the glass slabs were annealed to room temperature to permit visual inspection of glass quality and to cut samples for testing, this practice is not required. The melt need only be cooled to at least within the transformation range to yield an essentially crystal-free glass and then the nucleation-crystallization of the glass body commenced. The transformation range has been generally defined as that temperature at which a liquid melt becomes an amorphous solid, and has commonly been considered to lie in the vicinity of the glass annealing point.

Table II records nucleation and crystallization schedules employed with the glass bodies of Table I. Although definite dwell periods were utilized as a matter of convenience, it can be appreciated that no hold times as such are demanded, only that the body be exposed to temperatures within the nucleation and crystallization ranges. Crystallization temperatures in excess of about 1200° C. can lead to grain growth of the crystals and deformation of the body. At temperatures less than about 1050° C., growth of the desired beta-spodumene solid solution crystals is very slow. A minor amount of rutile, anatase, and/or gahnite crystallization will frequently be observed also. In the recorded examples, the bodies were heated in an electrically-fired furnace at a rate of about 5° C./minute to the recited dwell temperatures. At the completion of the crystallization, the electric current to the furnace was cut off and the articles simply allowed to cool to room temperature within the furnace. Much faster cooling rates are, of course, feasible because of the low coefficients of thermal expansion demonstrated by the crystallized bodies. However, this cooling within the furnace comprised a matter of convenience.

Table II also reports a visual description of the crystallized article, the crystal phases present therein as observed through X-ray diffraction analyses, and various physical characteristics where determined utilized conventional measuring techniques including modulus of rupture (psi), coefficient of thermal expansion ($\times 10^{-7}/°$ C.) over the range of 25°–700° C., the percent transmittance of infra-red radiation at a wavelength of 3.5 microns through a polished plate having a thickness of about 4.25 mm., the liquidus (° C.), and the viscosity of the glass at the liquidus (poises). In general, a viscosity of at least 10,000 poises is demanded to roll glass sheeting.

The articles are highly crystalline, i.e., greater than 75% by volume crystalline, and are commonly greater than 90% crystalline. The crystals, themselves, are generally smaller than about 1 micron in diameter.

TABLE II

| Ex. | Heat Treatment | Crystal Phases | Modulus of Rupture | Exp. Coef. | Infra-Red | Liquidus | Viscosity at Liquidus | Visual Description |
|---|---|---|---|---|---|---|---|---|
| 1 | 2 hours at 770° C<br>1 hour 1150° C | Beta-spodumene solid solution, anatase, trace of gahnite | 20,000 | 3.8 | 55 | 1267 | 32,000 | White, opaque, very fine-grained |
| 1 | 4 hours at 800° C<br>1 hour at 1175° C | " | 21,000 | 3.3 | 45 | 1267 | 32,000 | " |
| 2 | 3 hours at 750° C<br>1 hour at 1150° C | " | 16,000 | 6.1 | 56 | 1270 | 31,000 | " |
| 2 | 4 hours at 750° C<br>1 hour at 1175° C | " | 18,000 | 7.3 | 46 | 1270 | 31,000 | " |
| 3 | 4 hours at 760° C<br>1 hour at 1110° C | Beta-spodumene solid solution, rutile, trace of gahnite | 16,000 | 8.0 | — | 1248 | 38,000 | " |
| 4 | 3 hours at 770° C<br>1 hour at 1100° C | Beta-spodumene solid solution, rutile, trace of gahnite | 14,000 | 4.0 | 54 | 1221 | 60,000 | " |
| 5 | 3 hours at 750° C<br>1 hour at 1100° C | Beta-spodumene solid solution, anatase, trace of gahnite | 20,000 | 5.0 | — | 1280 | — | " |
| 6 | 3 hours at 770° C<br>1 hour at 1100° C | Beta-spodumene solid solution, anatase, trace of gahnite | 15,000 | 4.0 | — | 1260 | — | " |
| 7 | 4 hours at 760° C<br>1 hour at 1150° C | " | 15,000 | 6.1 | 72 | 1194 | 40,000 | " |
| 7 | 2 hours at 760° C<br>1 hour at 1175° C | " | 16,000 | 4.4 | 72 | 1194 | — | " |
| 8 | 4 hours at 780° C<br>1 hour at 1150° C | " | 16,000 | 4.3 | 72 | 1277 | 22,000 | " |
| 8 | 3 hours at 760° C<br>1 hour at 1100° C | " | 17,000 | 5.2 | 72 | 1277 | 22,000 | " |

TABLE II-continued

| Ex. | Heat Treatment | Crystal Phases | Modulus of Rupture | Exp. Coef. | Infra-Red | Liquidus | Viscosity at Liquidus | Visual Description |
|---|---|---|---|---|---|---|---|---|
| 9 | 2 hours at 760° C 1 hour at 1150° C | Beta-spodumene solid solution, rutile, trace of gahnite | 17,000 | 6.3 | 54 | 1240 | 48,000 | " |
| 9 | 2 hours at 800° C 1 hour at 1175° C | " | 18,000 | — | — | 1240 | 48,000 | " |
| 10 | 2 hours at 770° C 1 hour at 1150° C | Beta-spodumene solid solution, rutile, trace of gahnite | 19,000 | 6.0 | 56 | 1245 | 20,000 | " |
| 10 | 2 hours at 810° C 1 hour at 1175° C | " | 19,000 | — | — | 1245 | 20,000 | " |
| 11 | 2 hours at 760° C 1 hour at 1150° C | Beta-spodumene solid solution, anatase, gahnite | 15,000 | — | — | 1244 | — | " |
| 11 | 2 hours at 770° C 1 hour at 1175° C | " | 17,000 | 4.6 | 49 | 1244 | — | " |
| 12 | 3 hours at 780° C 1 hour at 1150° C | " | 17,000 | 6.6 | 70 | 1291 | 45,000 | " |
| 12 | 2 hours at 760° C 4 hours at 1175° C | " | 19,000 | — | — | 1291 | 45,000 | " |
| 13 | 4 hours at 770° C 1 hour at 1150° C | " | 14,000 | 7.0 | 59 | 1232 | 40,000 | " |
| 13 | 2 hours at 770° C 4 hours at 1175° C | " | 17,000 | — | — | 1232 | 40,000 | " |

The extremely deleterious effect which the presence of the alkaline earth metal oxides has upon the infra-red transmission of glass-ceramic bodies having base compositions in the $Li_2O$—$Al_2O_3$—$SiO_2$—$TiO_2$ system can be appreciated in a study of Corning Code 9608, referred to above as CORNING WARE ®, and Corning Code 9617, both compositions having been used as flat cooking surfaces. Approximate analyses therefor are set out below in weight percent:

|  | Code 9608 | Code 9617 |
|---|---|---|
| $SiO_2$ | 69.5 | 66.7 |
| $Al_2O_3$ | 17.6 | 20.5 |
| $Li_2O$ | 2.7 | 3.5 |
| MgO | 2.6 | 1.6 |
| ZnO | 1.0 | 1.2 |
| $TiO_2$ | 4.7 | 4.8 |
| $ZrO_2$ | 0.2 | 0.05 |
| $As_2O_3$ | 0.9 | 0.4 |
| F | 0.03 | 0.22 |
| $Fe_2O_3$ | 0.06 | 0.035 |
| $B_2O_3$ | 0.07 |  |
| $MnO_2$ | 0.03 |  |

Each composition yields a white, opaque, highly crystalline glass-ceramic article wherein beta-spodumene solid solution constitutes the primary crystal phase and the crystals are uniformly fine-grained. Several physical properties are listed below for each. The infra-red radiation transmittance measurements were made on 4.25 mm. thick polished plates at a wavelength of 3.5 microns.

|  | Modulus of Rupture | Exp. Coef. | Liquidus | Viscosity at Liquidus | Infra-Red |
|---|---|---|---|---|---|
| Code 9608 | 12,000 psi | 13.1 × 10⁻⁷/° C | 1222° C | 45,000 poises | 0% |
| Code 9617 | 19,000 psi | 11.5 × 10⁻⁷/° C. | 1248° C. | 20,000 poises | <5% |

A comparison of those data with Table II points up the fact that the compositions of the present invention yield products having physical characteristics quite comparable to those of the cited commercial compositions with the obviously desirable exception of a much improved infra-red radiation transmittance. Thus, Code 9608 and Code 9617 are essentially opaque to infra-red radiations.

Numerous tests have been devised to determine the chemical durability of glass-ceramic articles. For dinnerware and culinary ware applications, and, obviously, for smooth top cooking surfaces, resistance to food stains and cleaning detergents is of vital importance.

With regard to food staining, U.S. Pat. No. 3,582,371 describes a test involving the use of spinach extract as the staining agent. Reference is made to that patent for a full discussion of the test method. However, in brief, a 1% by weight aqueous solution of freeze-dried spinach extract is placed on the glass-ceramic surface. The coated sample is then heated at 5° C./minute to 400° C., maintained at that temperature for 20 minutes, and then withdrawn into the ambient environment. The surface is there-after washed and examined. When that test is applied to Code 9608 material, a slight gray color can be distinguished after two cycles. With Code 9617 material, a slight gray tint is observable after 10 cycles. With the materials of the present invention, no gray color can be detected even after 20 cycles of the test.

With regard to resistance to detergent attack, the following procedure has been devised. A 0.3% aqueous solution of SUPER SOILAX ® detergent, manufactured by Economics Laboratories, St. Paul, Minnesota, is prepared. The solution is heated to 95° C. and samples of the glass-ceramic immersed therein, the surface areas of the samples being limited by the ratio of 12 square inches to one pound of the solution. Samples are removed periodically from the hot solution, rinsed in tap water, and wiped dry. A portion of the glass-ceramic surface is coated with SPOTCHECK ® dye penetrant, marketed by Magnaflux Corporation, Chicago, Ill., and the dye allowed to stand thereon for 20 seconds. The dye is dried and the surface cleaned with a household cleanser powder for about 30 seconds. With the Code 9608 material, a slight stain is observable after a six-hour immersion in the solution. The Code 9617 material shows a slight stain after about 16 hours. The compositions of the present invention showed no residue after an immersion of 116 hours.

The following reports the durability of the materials when subjected to the more conventional tests for acid and alkaline durability. In both tests, a sample of the glass-ceramic is carefully weighed and its surface area measured so that loss in weight in milligrams per square centimeter (mg/cm²) can be calculated. In the acid test, a sample is immersed in a 5% by weight aqueous solution of HCl heated to 95° C. for 24 hours. In the alkaline test, a sample is immersed in a 5% by weight aqueous solution of NaOH for six hours at 95° C. The weight losses are listed below, that of the inventive materials being an average value.

|      | Code 9608 | Code 9617 | Inventive Materials |
|------|-----------|-----------|---------------------|
| HCl  | 0.12      | <0.01     | ~0.005              |
| NaOH | 2.82      | 0.70      | ~0.45               |

It is believed readily apparent that the materials of the present invention perform in a superior manner in each of the three tests.

I claim:

1. An opaque glass-ceramic article demonstrating a coefficient of thermal expansion (20°–700° C.) less than 15, excellent chemical durability, an infra-red transmittance at a wavelength of 3.5 microns through a polished plate of about 4.25 mm. thickness in excess of 40%, and wherein beta-spodumene solid solution constitutes the principal crystal phase, consisting essentially, by weight on the oxide basis, of about 2.5–4.5% $Li_2O$, 0.75–3.5% ZnO, 17.5–21% $Al_2O_3$, 65–71% $SiO_2$, 3.5–6% $TiO_2$, and being essentially free from alkaline earth metal oxides, alkali metal oxides other than $Li_2O$, and $ZrO_2$.

* * * * *